US011075817B1

United States Patent
Trim et al.

(10) Patent No.: US 11,075,817 B1
(45) Date of Patent: Jul. 27, 2021

(54) CONTEXT AWARE NETWORK CAPACITY AUGMENTATION USING A FLYING DEVICE

(71) Applicant: INTERNATIONAL BUSINESS MACHINES CORPORATION, Armonk, NY (US)

(72) Inventors: Craig M. Trim, Ventura, CA (US); Michael Edward Alexander, Great Falls, VA (US); Gandhi Sivakumar, Bentleigh (AU); Kushal S. Patel, Pune (IN); Sarvesh S. Patel, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/869,989

(22) Filed: May 8, 2020

(51) Int. Cl.
| | |
|---|---|
| *H04L 12/24* | (2006.01) |
| *H04W 64/00* | (2009.01) |
| *H04W 72/08* | (2009.01) |
| *H04W 88/16* | (2009.01) |
| *H04W 84/04* | (2009.01) |

(52) U.S. Cl.
CPC .......... *H04L 41/147* (2013.01); *H04W 64/00* (2013.01); *H04W 72/085* (2013.01); *H04W 84/042* (2013.01); *H04W 88/16* (2013.01)

(58) Field of Classification Search
CPC .. H04L 41/147; H04W 64/00; H04W 72/085; H04W 84/042; H04W 88/16
See application file for complete search history.

(56) References Cited

U.S. PATENT DOCUMENTS

| 10,198,205 B1* | 2/2019 | Freilich ................... G06F 3/061 |
| 2011/0075633 A1* | 3/2011 | Johansson ............. H04W 36/02 370/331 |

(Continued)

OTHER PUBLICATIONS

Yang et al., "Proactive Drone-Cell Deployment: Overload Relief for Cellular Network under Flash Crowd Traffic", IEEE, vol. 18, Issue: 10, Oct. 2017, DOI: 10.1109/TITS.2017.2700432) pp. 2877-2892, ISSN Information: 1558-0016, 16 pages.

(Continued)

*Primary Examiner* — Dinh Nguyen
(74) *Attorney, Agent, or Firm* — Brian Restauro; Andrew D. Wright; Roberts Calderon Safran & Cole, P.C.

(57) ABSTRACT

A method includes: receiving information from a source; determining a situational context for usage of UE devices in a specific area based on the received information, the UE devices communicating over a communication network and utilizing bandwidth of the communication network; predicting a location of the UE devices, the predicting being based on the received information and the determined situational context; predicting a bandwidth usage of the UE devices at the predicted location; predicting that a current bandwidth of the communications network is insufficient to provide the predicted bandwidth usage to the UE devices, the predicting that the current bandwidth is insufficient being based on the received information and the determined situational context; and deploying an aerial device that provides additional bandwidth to the communication network, the additional bandwidth being provided at the predicted location of the UE devices.

19 Claims, 7 Drawing Sheets

(56) References Cited

U.S. PATENT DOCUMENTS

| | | | |
|---|---|---|---|
| 2011/0182251 A1* | 7/2011 | Madan | H04W 72/1226 370/329 |
| 2016/0191142 A1 | 6/2016 | Boss et al. | |
| 2017/0111228 A1 | 4/2017 | Obaidi et al. | |
| 2018/0035306 A1 | 2/2018 | Zavesky et al. | |
| 2018/0102831 A1* | 4/2018 | Murphy | H04W 12/06 |
| 2019/0355145 A1* | 11/2019 | Bruner | H04W 4/38 |
| 2020/0112653 A1* | 4/2020 | Wang | H04L 65/4069 |

OTHER PUBLICATIONS

Xilouiris et al., "UAV-Assisted 5G Network Architecture with Slicing and Virtualization", IEEE Globecom Workshops, 2018, DOI:10.1109/glocomw.2018.8644408, ISBN Information: 978-1-5386-4920-6, 1 page.

Mell et al., "The NIST Definition of Cloud Computing", NIST, Special Publication 800-145, Sep. 2011, 7 pages.

Tasevski, "5G and Drones", https://dronebelow.com/2018/08/31/5g-and-drones/, Aug. 31, 2018, 4 pages.

Anonymous, "Samsung, Cisco and Orange Demonstrate 5G-Powered Drone and Industrial Robot at MWC19", https://news.samsung.com/global/samsung-cisco-and-orange-demonstrate-5g-powered-drone-and-industrial-robot-at-mwc19, Samsung Newsroom, Feb. 26, 2019, 4 pages.

Patel, "The Sky Is the Limit in 5G Game of Drones", https://www.einfochips.com/blog/sky-limit-5g-game-drones/, Oct. 27, 2017, 4 pages.

\* cited by examiner

US 11,075,817 B1

CONTEXT AWARE NETWORK CAPACITY AUGMENTATION USING A FLYING DEVICE

BACKGROUND

Aspects of the present invention relate generally to mobile communication networks and, more particularly, to adding capacity to an existing network.

Some mobile communication networks have a set bandwidth that determines the volume of data that the communication network can transmit from one device in the communication network to another device in the communication network. The devices can include devices such as phones, smart phones, tablets, computers, communication network equipment, and other devices that transmit and/or receive data over the communication network.

In some wireless communication networks such as, for example, a fifth generation (5G) network, an evolved universal mobile telecommunications service terrestrial radio access network (evolved-UMTS terrestrial radio access network)(E-UTRAN) is an air interface between user devices and a home serving gateway of the network. In these networks, a E-UTRAN Node B (evolved Node B)(eNodeB) is hardware that communicates directly and wirelessly with the user devices. A NodeB (as opposed to an eNodeB) has minimal functionality and is controlled by a radio network controller (RNT). However, with an eNodeB there is no separate controller element. In some networks, the eNodeB is connected wirelessly to a serving gateway (SGW) by an S1 bearer. The S1 bearer is a channel that transports packets of information between the eNodeB and the SGW.

SUMMARY

In a first aspect of the invention, there is a computer-implemented method including: receiving, by a computing device, information from a source; determining, by the computing device, a situational context for usage of user end (UE) devices in a specific area based on the received information, the UE devices communicating over a communication network and utilizing bandwidth of the communication network; predicting, by the computing device, a location of the UE devices, the predicting being based on the received information and the determined situational context; predicting, by the computing device, a bandwidth usage of the UE devices at the predicted location; predicting, by the computing device, that a current bandwidth of the communications network is insufficient to provide the predicted bandwidth usage to the UE devices, the predicting that the current bandwidth is insufficient being based on the received information and the determined situational context; and deploying, by the computing device, an aerial device that provides additional bandwidth to the communication network, the additional bandwidth being provided at the predicted location of the UE devices.

In another aspect of the invention, there is a computer program product including one or more computer readable storage media having program instructions collectively stored on the one or more computer readable storage media. The program instructions are executable to: receive information from a source; determine a situational context for usage of user end (UE) devices in a specific area based on the received information, the UE devices communicating over a communication network and utilizing bandwidth of the communication network; predict a location of the UE devices, the predicting being based on the received information and the determined situational context; predict a bandwidth usage of the UE devices at the predicted location; predict that a current bandwidth of the communications network is insufficient to provide the predicted bandwidth usage to the UE devices, the predicting that the current bandwidth is insufficient being based on the received information and the determined situational context; deploy an aerial device that provides additional bandwidth to the communication network, the additional bandwidth being provided at the predicted location of the UE devices; monitor use of the additional bandwidth; and determine, as a result of the monitoring and after providing the additional bandwidth, the additional bandwidth is no longer needed to provide service to the UE devices.

In another aspect of the invention, there is system including a processor, a computer readable memory, one or more computer readable storage media, and program instructions collectively stored on the one or more computer readable storage media. The program instructions are executable to: receive information from a source; determine a situational context for usage of user end (UE) devices in a specific area based on the received information, the UE devices communicating over a communication network and utilizing bandwidth of the communication network; predict a location of the UE devices, the predicting being based on the received information and the determined situational context; predict a bandwidth usage of the UE devices at the predicted location; predict that a current bandwidth of the communications network is insufficient to provide the predicted bandwidth usage to the UE devices, the predicting that the current bandwidth is insufficient being based on the received information and the determined situational context; deploy an aerial device that provides additional bandwidth to the communication network, the additional bandwidth being provided at the predicted location of the UE devices; predict a trajectory of the UE devices, the predicting being based on the received information and the determined situational context; and direct the aerial device to travel along the predicted trajectory. The additional bandwidth is provided along the predicted trajectory.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
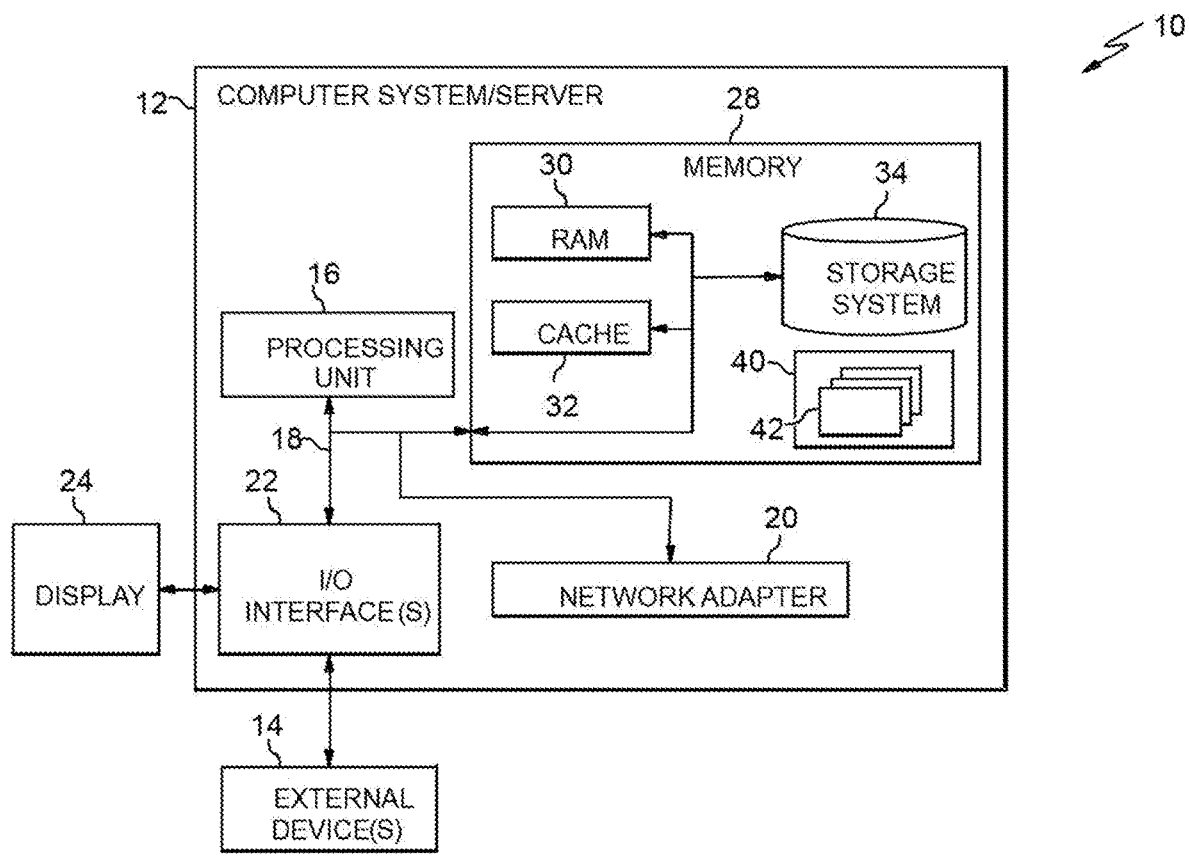
FIG. 1 depicts a cloud computing node according to an embodiment of the present invention.

Aspects of the present invention relate generally to mobile communication networks and, more particularly, to adding capacity to an existing network. According to aspects of the invention, a computer device dispatches an eNodeB carried by an aerial device to a location where a wireless telecommunication network has insufficient bandwidth for a particular event. In embodiments, the eNodeB is built into the aerial device. In embodiments, the computer device determines a temporary need for additional bandwidth at the location by analyzing data from multiple sources. In this manner, implementations of the invention provide temporary additional needed bandwidth in the wireless telecommunication network at the location of the event.

In embodiments of the invention, a computer-implemented method includes: receiving information collected from one or more internet of things (IoT) devices, wherein the information collected comprises input from news feed, location information, and internet situation data capitals; determining a situation context for device usage in a specific area based on the received information; predicting a trajectory of devices utilizing bandwidth based on the received information and determined content; and deploying an aerial device that extends network coverage capabilities to be used by the IoT devices. In some embodiments, the method further includes: allocating a dedicated logical channel as an S1 bearer that is used for direct data transmission from a physical eNodeB to internal elements such as the S1 bearer; treating a logical channel as a virtual S1 bearer; and determining a QoS (quality of service) Class Identifier (QCI) expectation based on an event, assignment of QCI, dynamic change in a dedicated traffic channel (DTCH) bandwidth and QCI index; and bypassing compression and alignment at the physical eNodeB.

Implementations of the disclosure are an improvement to the technical field of cellular communication networks. For example, embodiments of the invention provide a temporary increase in bandwidth to a wireless communication network by deploying an aerial device including an eNodeB communication link between mobile device users and a serving gateway of the network.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Embodiments of the invention provide a method and apparatus for a fifth generation (5G) telecommunication network that provides aerial device based eNodeB capabilities that can sense for the respective context, data, and bandwidth requirements and allocate a dedicated virtualized S1 bearer channel between one or more aerial device based eNodeB to a base transceiver station (BTS) eNodeB, allocates a dynamic QCI level for the created channel for processed data transmission over a radio bearer. Embodiments of the invention include: detecting an event and the nature of the event; mapping the event with the data and coverage requirements; controlling the cognitive aerial device movement based on location and time based situational needs to provide better telecommunication network coverage; avoiding congestion on the telecommunication network; and offering a seamless data transmission in the user mass assembly mobility cases as discussed below.

Advancements in the telecommunication industry have been a key enabler for many technologies including Artificial Intelligence (AI) to succeed by breaking the barrier of various factors like sedentary operations, lower bandwidth, etc. The 5G technology is expected to serve as a rich enabler to push the dependent technologies to an even higher level through mobility bandwidth of 1 gigabit per second (GBPS), convergence of IoT device access, etc. One feature of 5G technology is the network itself being intelligent and cognitive along with a capability of creating and exchanging information in a dynamic ad-hoc network of 5G enabled devices. Thus, the 5G network is expected to become a part of the human community through various features including observing the surroundings, reasoning, inferring, and making decisions like humans.

Some aerial devices use battery power to fly and a wireless interconnect like WiFi for communication with ground-based controller systems. The cognition capabilities in the aerial devices enable aerial device movement in a more natural way. With the enablement of IoT, the aerial devices possess the capability to sense various information using input sensors placed on the body of the aerial device and transfer the stream to a connected controller for further data processing. This includes communication with multiple computing resources including other aerial devices that may combine to form an aerial device network.

Embodiments of the invention include an apparatus to work with a 5G service orchestration layer and that works as a dynamic, aerial device based virtual eNodeB to serve a related geographical area based on the situational need for telecommunication resources. Embodiments of the invention are an aerial device based apparatus that provides additional coverage and processing capability that can be used by UE devices for better service from the telecommunication network. Embodiments anticipate the resource requirement based on a detected event and provide one or more aerial device eNodeB to cover the area. Embodiments of the invention enhance the 5G network by providing better coverage based on inferring situational insights along with dynamic high bandwidth logical S1 bearer creation.

There is a need for a mechanism that can sense situation-based data and bandwidth needs of a telecommunication network and accordingly provide software-based features at the telecommunication level. Also, there is a need for an instrument that can detect the network requirement for certain situations (events in motion) and detect that the currently available network resources are not adequate for this location for the specific time and nature of the event. Further, there is a need for a mechanism in 5G technology that can allocate a dedicated logical channel as an S1 bearer that can be used for direct data transfer from a physical eNodeB to internal communication network architecture elements. Embodiments provide an aerial device positioned coverage provider for special events (including events that move from one geographic location to another) that is valuable in conjunction with 5G telecommunication space.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
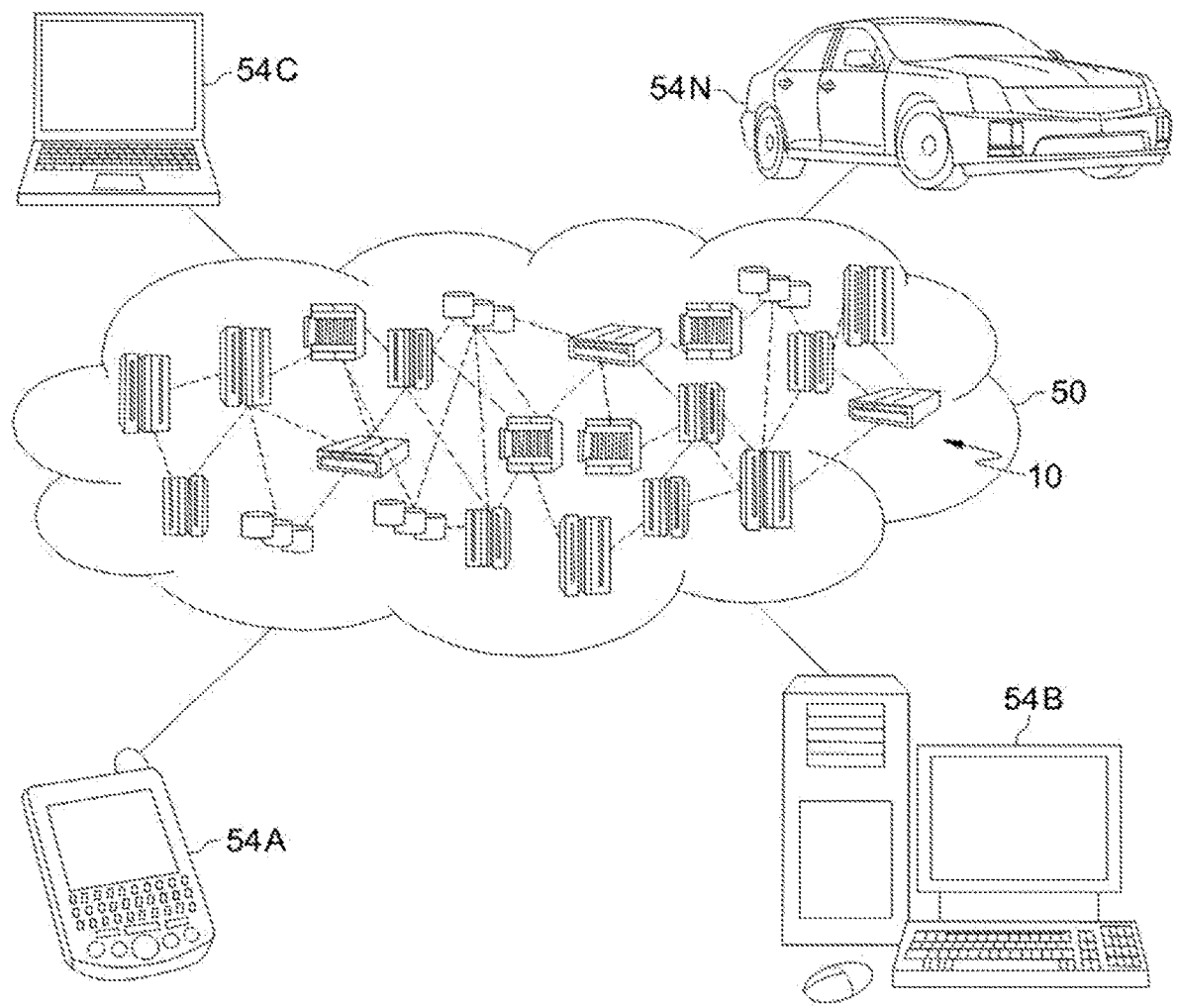
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
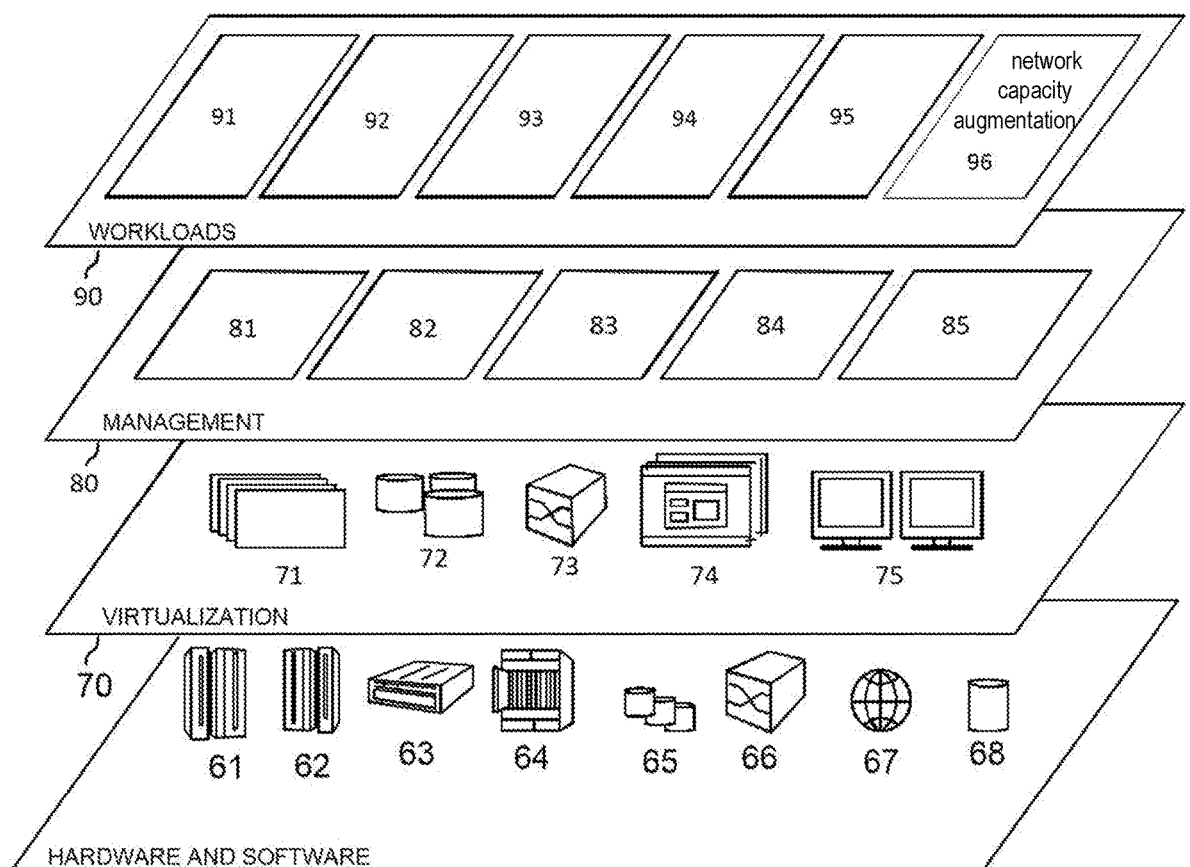
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network capacity augmentation 96.

Implementations of the invention may include a computer system/server 12 of FIG. 1 in which one or more of the program modules 42 are configured to perform (or cause the computer system/server 12 to perform) one of more functions of the network capacity augmentation 96 of FIG. 3. For example, the one or more of the program modules 42 may be configured to: receive information from a source; determine a situational context for network device usage of network devices in a specific area based on the received information, the network devices communicating over a communication network and utilizing bandwidth of the communication network; predict a location of the network devices, the predicting being based on the received information and the determined context; and deploy an aerial device that provides additional bandwidth to the communication network, the additional bandwidth being provided at the predicted location of the network devices.

Embodiments of the invention provide a system working in the service orchestration layer of a 5G network and co-existing with existing mobility monitoring tools that gather information from various resources and providing an interpretation of data and bandwidth requirement based on time and situation of an event. Embodiments of the invention further collect inputs from news feeds, local information managers, and other internet situation data capitals and derive the situational context for the boundary area based on time. Embodiments inline classify the collected input streams to determine the bandwidth requirements and data requirements based on the nature of the event. Further, embodiments determine a trajectory of the event (if it is a moving event) and determine a boundary area for the new bandwidth and data requirements of the event. Embodiments allocate to an aerial device eNodeB system (also referred to as an aerial device eNodeB) a dedicated high bandwidth logical channel and send the aerial device to the location of interest (the event). In embodiments, the aerial device eNodeB comprises eNodeB capabilities integrated into the aerial device as hardware and software that is responsible for data compression, packet deduplication, and other features of an eNodeB. In embodiments, the aerial device is dispatched from an eNodeB aerial device station to cover the event. In embodiments, the aerial device eNodeB system sends processed packets of information to a static eNodeB base station transceiver. Because embodiments create a dedicated logical channel between the aerial device eNodeB and the static (base station) eNodeB, embodiments treat the data stream coming from the aerial device eNodeB differently from data received directly from UE devices. Embodiments treat the data differently in that embodiments directly transfer data from the aerial device eNodeB to internal network system components of the network without further compression and other logical data processing. This results in the dedicated high bandwidth logical channel being a virtual S1 bearer.

In embodiments, the aerial device eNodeB determines a type of the event by applying various serial and parallel classifiers on input data streams such as, for example, news data. Embodiments use geo-specific data integrated with personality insights to regulate the data requirements. In embodiments, examples of the regulation of the data requirements are more-images, less-voice, etc., that are further mapped with actual bandwidth obligations. The service orchestration layer determines the resource requirement based on the above and elects the bandwidth requirement for the aerial device eNodeB to base station eNodeB logical channel. Embodiments determine the QCI characteristics based on the nature of the event and its importance and assign these QCI characteristics to the logical channel created from the static eNodeB to the aerial device eNodeB.

The following is an example of a method in accordance with embodiments of the invention. A news feed reports that a public figure will be going from location X to location Y at 9 AM today. Embodiments classify this information at the service orchestration layer of the 5G network. Embodiments anticipate media coverage will result in increased video streaming and photographical data transmission across the network. Embodiments identify the trajectory as being from location X to location Y, recognize intermediate hops (intermediate network devices through which the data will pass), and create a map based on the available information. Embodiments create a dedicated logical channel from a base station eNodeB to the aerial device eNodeB and dispatch the aerial device from an eNodeB aerial device station to location X at 9 AM to cover the event. Once the aerial device reaches the event location (location X), embodiments connect all the related UE devices to the aerial device eNodeB and give the UE devices the benefit of an in-motion eNodeB that moves with the event. Once the aerial device detects the end of the event, the aerial device flies back to the eNodeB aerial device station and the virtualized logical S1 bearer is dislocated from the static eNodeB. Because embodiments process the data and other eNodeB processing at the aerial device level, congestion at the static eNodeB is avoided/reduced, providing increased efficiency of the overall telecommunication infrastructure (for example, a 5G telecommunication infrastructure).

Figure 4:
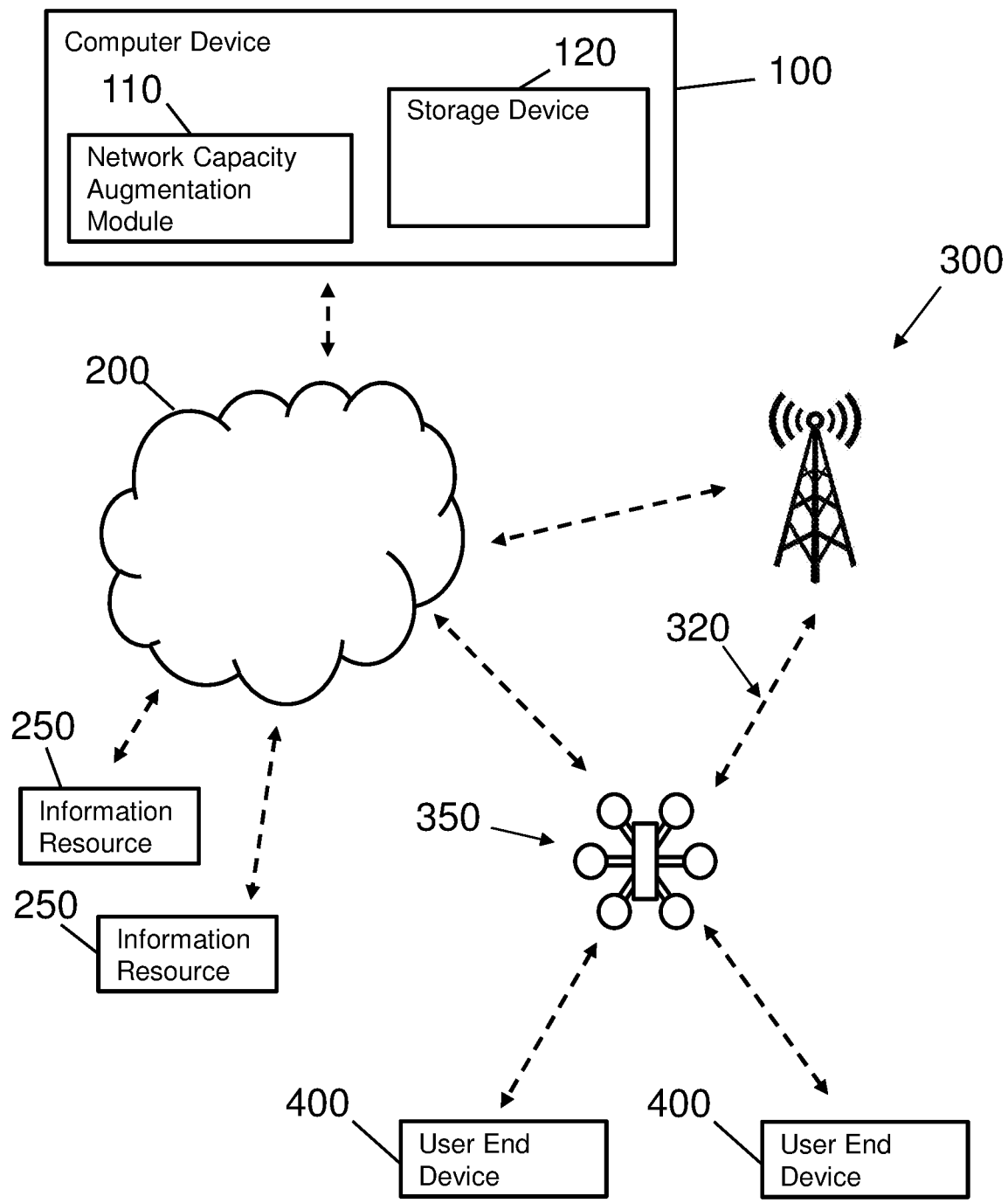
FIG. 4 shows a block diagram of an exemplary environment in accordance with aspects of the invention.

FIG. 4 shows a block diagram of an exemplary environment in accordance with aspects of the invention. In embodiments, the environment includes a computer device 100 such as, for example, computer system/server 12 in FIG. 1, that communicates over one or more networks 200 such as, for example, cloud computing environment 50. In this example, computer device 100 includes a network capacity augmentation module 110, for example, one or more of program modules 42 in FIG. 1, and a storage device 120 such as, for example, storage system 34 in FIG. 1.

FIG. 4 shows two information resources 250 such as, for example, another computer device having some or all of the features of computer system/server 12 in FIG. 1, that is external to computer device 100 and contains programs and/or data that is accessed by network capacity augmentation module 110 (other examples include fewer or more than two information resources 250). In embodiments, one or more other information resource (such as a database) that is accessed by network capacity augmentation module 110 is stored on storage device 120 and/or other storage devices.

FIG. 4 shows a wireless telecommunication network 300 that communicates through network 200 with computer device 100. In embodiments, network 300 is a cellular communication network such as, for example, a 5G cellular communication network. In this embodiment, one or more aerial device 350 includes an eNodeB to connect to network 300 over a virtual S1 bearer 320 and provide additional bandwidth to network 300. In embodiments, a virtual S1 bearer is a virtualization, using hardware and software on aerial device 350 and/or at base station transceiver (such as an SGW), of an S1 bearer. In this embodiment, user end (UE) devices 400 communicate with network 300 either directly or through aerial device 350. In embodiments, UE devices 400 are mobile phones, smart phones, tablets, computers, and/or other devices that are capable of communicating over network 300. Although two UE devices 400 are shown in FIG. 4, other embodiments include fewer or more UE devices 400.

In embodiments, computer device 100 comprises network capacity augmentation module 110, which may comprise one or more program modules such as program modules 42 described with respect to FIG. 1. Computer device 100 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In embodiments, network capacity augmentation module 110 collects data from various input streams from information resources 250 such as, for example, news feeds, local culture information, earth data sets, and other internet resources and extracts them to the service orchestration layer of network 300 (for example, a 5G network). In embodiments, network capacity augmentation module 110 connects to various resources from the service orchestration layer via means of application program interfaces (APIs) and a multi-service management (MSM) plane of network 300 and collects the related information. In embodiments, network capacity augmentation module 110 classifies the information using serial and parallel classifiers, inline stream classifiers, and consideration of dynamic computing platforms for time based situational data, to infer situational insights and event identification. In embodiments, network capacity augmentation module 110 integrates with a personality insights database to predict the data and bandwidth requirement of users based on the time and situation of an event. In embodiments, network capacity augmentation module 110 detects the situation and anticipates the bandwidth and data transmission requirement for the event.

In embodiments, network capacity augmentation module 110 communicates with an aerial device station for dispatch of aerial device 350 with an eNodeB that is capable of covering the event. In embodiments, network capacity augmentation module 110 instructs the service orchestration layer of network 300 to provide network function virtualization in the eNodeB of aerial device 350. In embodiments, network capacity augmentation module 110 allocates a dedicated 5G logical channel based on the bandwidth requirements between the eNodeB in aerial device 350 and a static eNodeB base station transceiver (such as an SGW). In embodiments, network capacity augmentation module 110 discovers the QCI level for the desired traffic arbitration and allocates the relevant QCI characteristic autonomously to the logical channel between the static eNodeB base station transceiver and aerial device 350.

In embodiments, the eNodeB in aerial device 350 performs eNodeB functions with software-based 5G eNodeB architecture that performs compression, serialization, deduplication, and other related eNodeB operations. In embodiments, network capacity augmentation module 110 distinguishes between the channel used by the eNodeB in aerial device 350 and other channels and causes network 300 to bypass further processing at the base station transceiver because the compression and other operations are performed by the eNodeB on aerial device 350. This creates virtualized S1 bearer 320 to cover the area that has higher than normal data/bandwidth needs for a certain amount of time to cover the event.

In embodiments, network capacity augmentation module 110 determines a trajectory of the event (if the event is a moving event) and accordingly controls the position of aerial device 350 as UE devices 400 in proximity to the event move. In embodiments, network capacity augmentation module 110 causes aerial device 350 to fly back to the aerial device station after the event ends and/or the gathering of UE devices 400 disappears. In embodiments, network capacity augmentation module 110 deallocates the dedicated logical channel and unencumbers resources at the network base station.

Embodiments are beneficial because they: dynamically sense a need of further coverage based on collected input streams and autonomously provision an additional aerial device 5G eNodeB for added bandwidth and/or coverage; offload the processing to an aerial device 5G eNodeB and thereby reduce processing congestion at the static base station eNodeB level, which achieves better performance of the 5G network; and/or provide dynamic capability to move the aerial device with a moving event to achieve better coverage.

Figure 5:
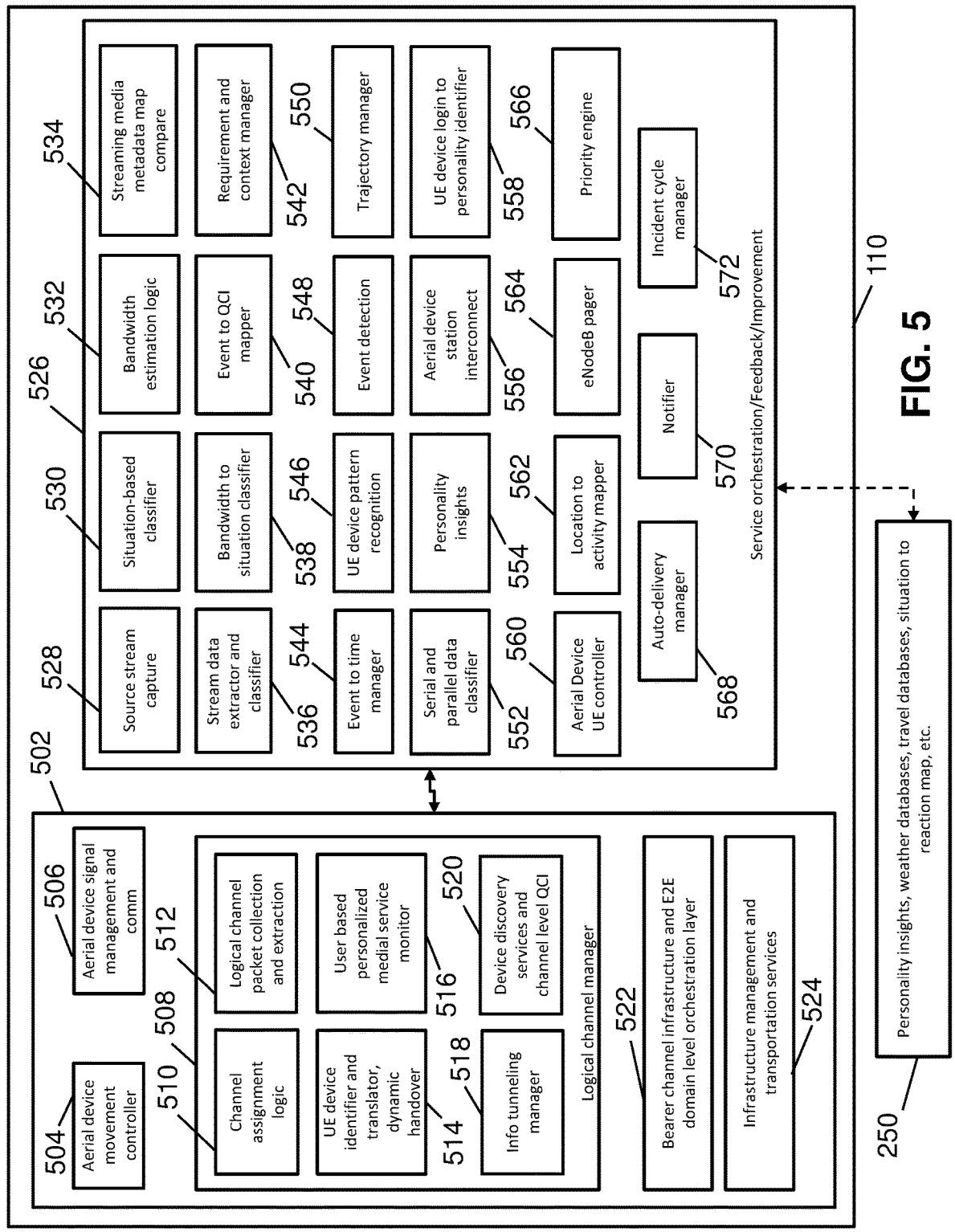
FIG. 5 shows a block diagram of an exemplary embodiment of the present invention.

FIG. 5 shows an exemplary embodiment of network capacity augmentation module 110 in having a main section 502 and a service orchestration/feedback/improvement section 526. In embodiments, main section 502 and service orchestration/feedback/improvement section 526 include a plurality of program modules such as, for example, program modules 42 described with respect to FIG. 1. Also shown in FIG. 5 are information resources 250. In this example, information resources 250 include, among other things, personality insights, weather databases, travel databases, and a situation to reaction map. In embodiments, the situation to reaction map provides mapping between various situations and the associated desired reaction by aerial device 350.

In this embodiment, main section 502 includes a plurality of modules 504, 506, 508, 510, 512, 514, 516, 518, 520, 522, 524, which may comprise one or more program modules such as program modules 42 described with respect to FIG. 1. In the embodiment shown in FIG. 5, main section 502 includes an aerial device movement controller 504 that controls the movement of aerial device 350 based on a determined locational need that network capacity augmentation module 110 makes. An aerial device signal management and communication module 506 manages a communication signal from network capacity augmentation module 110 to aerial device 350.

In this embodiment, a logical channel manager 508 includes various functions and parameters related to the logical channel between aerial device 350 and network 300 that network capacity augmentation module 110 performs and/or uses. A channel assignment logic parameter 510 contains the information that network capacity augmentation module 110 uses to assign a logical channel to aerial device 350. A logical channel packet collection and extraction function 512 performs logical channel packet collection and extraction. A UE device identifier and translator, dynamic handover function 514 identifies user end (UE) devices 400, performs any translations required by network 300, and dynamically performs the handover of the communication from UE devices 400 to network 300. A user based personalized medial service monitor 516 monitors medial services (such as information resources 250) for information relevant to a particular UE device 400. An information tunneling manager 518 manages tunneling into information in, for example, information resources 250 to find information relevant to deploying and controlling aerial device 350. Device discovery services and channel level QCI function 520 discovers UE devices 400 in the area of the event and determines the QCI expectation based on the event.

In the embodiment shown in FIG. 5, main section 502 of network capacity augmentation module 110 includes a bearer channel infrastructure and end-to-end (E2E) domain level orchestration layer 522 that includes hardware and software that automates the treatment of communications on network 300. Network capacity augmentation module 110 performs bearer channel infrastructure management and transportation services 524 such as, for example, managing the infrastructure of orchestration layer 522 and the transportation of communications through aerial device 350.

In this embodiment, service orchestration/feedback/improvement section 526 includes a plurality of modules 528, 530, 532, 534, 536, 538, 540, 542, 544, 546, 548, 550, 552, 554, 556, 558, 560, 562, 564, 566, 568, 570, 572, which may comprise one or more program modules such as program modules 42 described with respect to FIG. 1. In this embodiment, section 526 includes source stream capture 528 that captures streams from information resources 250. A situation-based classifier 530 classifies information that network capacity augmentation module 110 receives from information resources 250. In this embodiment, network capacity augmentation module 110 uses the information classified by situation-based classifier 530 (and other classifiers discussed herein) to infer situational insights that indicate that an event might be upcoming. For example, a stream data extractor and classifier 536 extracts and classifies information that network capacity augmentation module 110 receives from information resources 250. In this embodiment, a bandwidth to situation classifier 538 classifies a situation as requiring a particular amount of bandwidth in network 300. In this embodiment, a serial and parallel data classifier 552 classifies serial and parallel data that network capacity augmentation module 110 receives from information resources 250.

In this embodiment, network capacity augmentation module 110 uses event detection 548 to detect an event based on the various classified data. In this embodiment, network capacity augmentation module 110 uses bandwidth estimation logic 532 to estimate the bandwidth needed for the event detected by event detection 548. In embodiments, network capacity augmentation module 110 uses an event to QCI mapper to map a detected event to a QCI expectation for that event or type of event. In embodiments, network capacity augmentation module 110 uses streaming media metadata map compare 534 to compare metadata of streaming media to a geographical map to assist a trajectory manager 550 in determining changes in a route of a moving event. In embodiments, network capacity augmentation module 110 uses a requirement and context manager 542 to manage what requirements and context are needed for classified data to be considered in detecting an event.

In embodiments, network capacity augmentation module 110 uses personality insights 554 of various UE device users in estimating a bandwidth requirement for an event. For example, if UE devices (for example smart phones) indicate that photographs and video are commonly taken at events such as the detected event, network capacity augmentation module 110 estimates a relatively large bandwidth requirement for the event. In embodiments, a UE device login to personality identifier 558 identifies personality insights when a UE device is logged into network capacity augmentation module 110.

In embodiments, an aerial device station interconnect 556 connects network capacity augmentation module 110 to an aerial device station to provide communication between network capacity augmentation module 110 an aerial device 350. In embodiments, network capacity augmentation module 110 controls aerial device 350 though an aerial device UE controller 560. In embodiments, a location to activity mapper 562 dynamically determines a location of the event, and changes to the location of the event, based on activity from user end devices 400.

In embodiments, an eNodeB pager 564 determines the paging load processing by the eNodeB of aerial device 350. In embodiments, a priority engine 566 different priorities to different communications over the S1 bearer 320. In some embodiments, an auto-delivery manager 568 determines that a plurality of aerial devices 350 are to be sent to a plurality of different locations. In embodiments, a notifier 570 notifies the aerial device base of an initial deployment of aerial device 350 and any subsequent instructions regarding aerial device 350. In embodiments, an incident cycle manager 572 manages malfunctions or other incidents in network 300.

Figure 6:
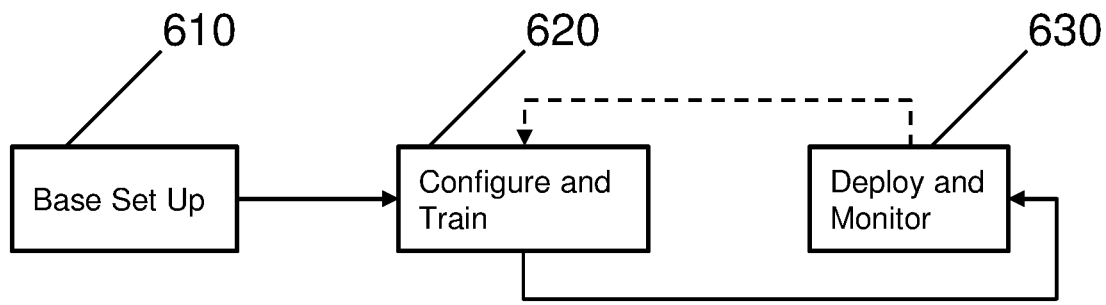
FIG. 6 shows a block diagram of an exemplary method in accordance with aspects of the invention.

FIG. 6 shows an example of training and context awareness in embodiments of the invention. In this example, at operation 610, network capacity augmentation module 110 is set up to communicate with a graphical user interface (GUI) such as, for example, external devices 14 and display 24 of FIG. 1, to define priorities, and to interlink with information resources 250. In embodiments, channel assignment logic module 510, logical channel packet collection and extraction module 512, UE device identifier and translator, dynamic handover module 514, user based personalized medial service monitor 516, information tunneling manager 518, and device discovery service and channel level QCI module 520 perform operation 610.

In the example shown in FIG. 6, at operation 620, network capacity augmentation module 110 is configured based on historical databases and trained with updates, for example, continuously, at periodic intervals, based on events, and/or based on stability. In embodiments, bandwidth estimation logic 532 and bandwidth to situation classifier 538 configure network capacity augmentation module 110 using historical databases in information resources 250. In embodiments, incident cycle manager 572 trains/updates network capacity augmentation module 110 periodically based on event detection module 548, bandwidth to situation classifier 538, and/or feedback from other modules of network capacity augmentation module 110.

In the example shown in FIG. 6, at operation 630, network capacity augmentation module 110 deploys aerial device 350 and monitors the operation of aerial device 350. Examples of operation 630 include sensing user interaction, collecting data, providing an access pattern, suggesting bandwidth to be provided, updating feedback, monitoring data quality, and updating personalized data. In embodiments, aerial device movement controller 504 sends a command to an aerial device base to deploy aerial device 350 and monitors aerial device 350 during operation.

In a method in accordance with embodiments of the invention, a service orchestration layer of telecommunication network 300 initiates a service instance for an aerial device based special coverage system. As a result of the service instantiation, network capacity augmentation module 110 loads data structures to the service orchestration layer, triggers defined information resources 250 to send data streams, and identifies and provisions receiver data locations.

In embodiments, network capacity augmentation module 110 provisions the required network resources of network 300 such as, for example, S1 bearer 320, for the service instantiation, creates a software-based eNodeB on aerial device 350, and triggers virtual network functions to start data transmission over S1 bearer 320. Network capacity augmentation module 110 initiates interconnect API instances and performs handshaking to transmit a data requirement signal by the eNodeB on aerial device 350.

In embodiments, network capacity augmentation module 110 collects the various data from information resources 250, as discussed above. The various data includes, for example, news data feeds, environmental data, political data mappers, and other personality and time related data. Network capacity augmentation module 110 collects internet data using application programming interface (API) based interconnect calls to the appropriate web locations, parses the fetched data and moves the fetched data to, for example, storage device 120. Inline classifiers perform serial or parallel data classification (serial and parallel data classifier 552) and inferences of situational context with time, location and situation (situation-based classifier 530).

In embodiments, network capacity augmentation module 110 uses the information from situational context classifiers (situation-based classifier 530), history mappers, and metadata classifiers to form situational insights for the event. Network capacity augmentation module 110 anticipates, after the situational insights are inferred, the bandwidth and data streaming required by the event. Network capacity augmentation module 110 categorizes events as either stationary or in-motion events (with, for example, trajectory manager 550) and accordingly performs forecasting updates to increase accuracy.

In embodiments, if the event is classified as an in-motion event (for example, a rally, processional, or parade), network capacity augmentation module 110 constructs a map at the service orchestration layer using the collected information insights with, for example, location to activity manager 562. Network capacity augmentation module 110 provides the map to aerial device 350 for aerial device 350 to follow.

In embodiments, network capacity augmentation module 110 supplies the map and the bandwidth and data streaming requirements (with, for example, bandwidth estimation logic 532) of the event to a virtualized network function (VNF) layer of the architecture of network 300 that communicates with a static eNodeB of network 300. Upon reception of this information, the static eNodeB provisions a dedicated logical channel creation process and reserves resources of network 300 for the dedicated logical channel. In embodiments, network capacity augmentation module 110 determines a nearest aerial device station that has aerial device 350 in its available aerial device inventory. In embodiments, the aerial device station provides a unique identification for aerial device 350 that network capacity augmentation module 110 uses to communicate with aerial device 350. Network capacity augmentation module 110 communicates with aerial device 350 (through, for example, aerial device movement controller 504) and shares the map constructed by network capacity augmentation module 110 with the eNodeB of aerial device 350.

In embodiments, aerial device 350 sends control instructions to the static eNodeB (over, for example, aerial device station interconnect 556) to create a dedicated logical channel (logical dedicated traffic channel)(logical DTCH) over virtual S1 bearer 320 of network 300. In response to this instruction, the static eNodeB uses the already reserved resources and creates a logical DTCH over the S1 bearer between the static eNodeB and the eNodeB on aerial device 300. The static eNodeB assigns the defined bandwidth, data characteristics (priority, for example), and QCI values to the DTCH based on the nature of the event.

In embodiments, once the logical DTCH is established, network capacity augmentation module 110 sends inbound API signals to the static eNodeB to instruct the static eNodeB to treat the input and output on the logical DTCH differently than input/output of other devices. In embodiments, the eNodeB on aerial device 350 performs data compression, alignment, and deduplication and, therefore, these operations are bypassed at the static eNodeB and the data stream over the S1 bearer is directly integrated into network 300.

In embodiments once the logical channel provisioning is completed, network 300 identifies particular ones of UE devices 400 in a coverage area of the eNodeB on aerial device 350 and transfers them to the eNodeB on aerial device 350. In embodiments, the transfers are performed using existing mobility handover mechanisms of changing a base transfer station (BTS).

In embodiments, network capacity augmentation module 110 continuously monitors the input data streams from information resources 250 to continuously confirm that the event is active (with, for example, event detection module 548). Once the event ends, network capacity augmentation module 110 sends a signal to the VNF, service and programmability framework, aerial device base, and the eNodeB on aerial device 350 based on information received through event detection module 548. Upon reception this signal, network 300 retransfers UE devices 400 to the static eNodeB(s) and dissolves the DTCH free the resources. Once the DTCH is dissolved, network capacity augmentation module 110 instructs aerial device 350 to fly back to the aerial device base and change its status to free so that it is available for a subsequent request.

Figure 7:
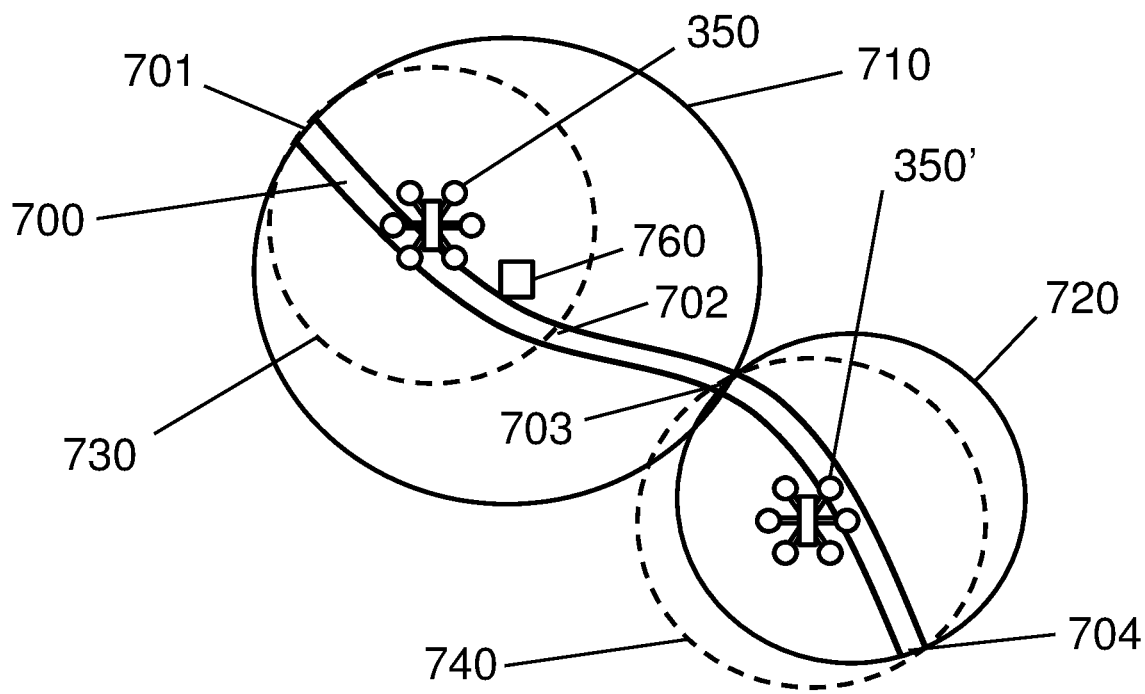
FIG. 7 shows a diagram of an exemplary method in accordance with aspects of the invention.

FIG. 7 shows an example of embodiments of the invention. In FIG. 7, network capacity augmentation module 110 determines an event route 700 as described above. In this example, a public figure is scheduled to travel along route 700. Area 710 is an area where signal strength and bandwidth of network 300 are supplied by static eNodeB 760 and are sufficient for normal conditions. Area 730 is an area where bandwidth is provided by the eNodeB on aerial device 350. In this example, a large number of UE devices 400 (for example, mobile phones) are congregated at a starting point 701 of route 700 and, therefore more bandwidth than normal is needed to provide the desired data transmission over network 300. In this situation, even though signal strength and bandwidth are sufficient in area 710 for normal conditions, the added demand for bandwidth placed on network 300 by the event is not met by static eNodeB 760. The bandwidth provided by the eNodeB on aerial device 350 added to the bandwidth provided by static eNodeB 760 is sufficient to provide satisfactory service to all UE devices 400 in the area of the event.

In the example shown in FIG. 7, a portion of route 700 between points 702 and 703 is covered by only static eNodeB 760 and not by the eNodeB on aerial device 350. However, the bandwidth provided by static eNodeB 760 is sufficient because, in this example, network capacity augmentation module 110 determines (from data it received from information resources 250) that static eNodeB 760 provides sufficient band width for the projected number and/or uses of UE devices 400 between points 702 and 703. In other examples, network capacity augmentation module 110 instructs aerial device 350 to follow route 700 as the event moves along route 700 to provide its added bandwidth to network 300.

In the example shown in FIG. 7, an area 720 is an area where coverage of network 300 is poor. In this example, network 300 provides sufficient bandwidth in area 710 for a number of UE devices 400 (for example, mobile phones), but cannot provide sufficient bandwidth for these same UE devices 400 in area 720 due to the poor coverage in area 720. An area 740 is an area where bandwidth is provided by the eNodeB on aerial device 350'. In this situation, the eNodeB on aerial device 350' provides sufficient bandwidth for the number of UE devices 400 between points 703 and 704.

Figure 8:
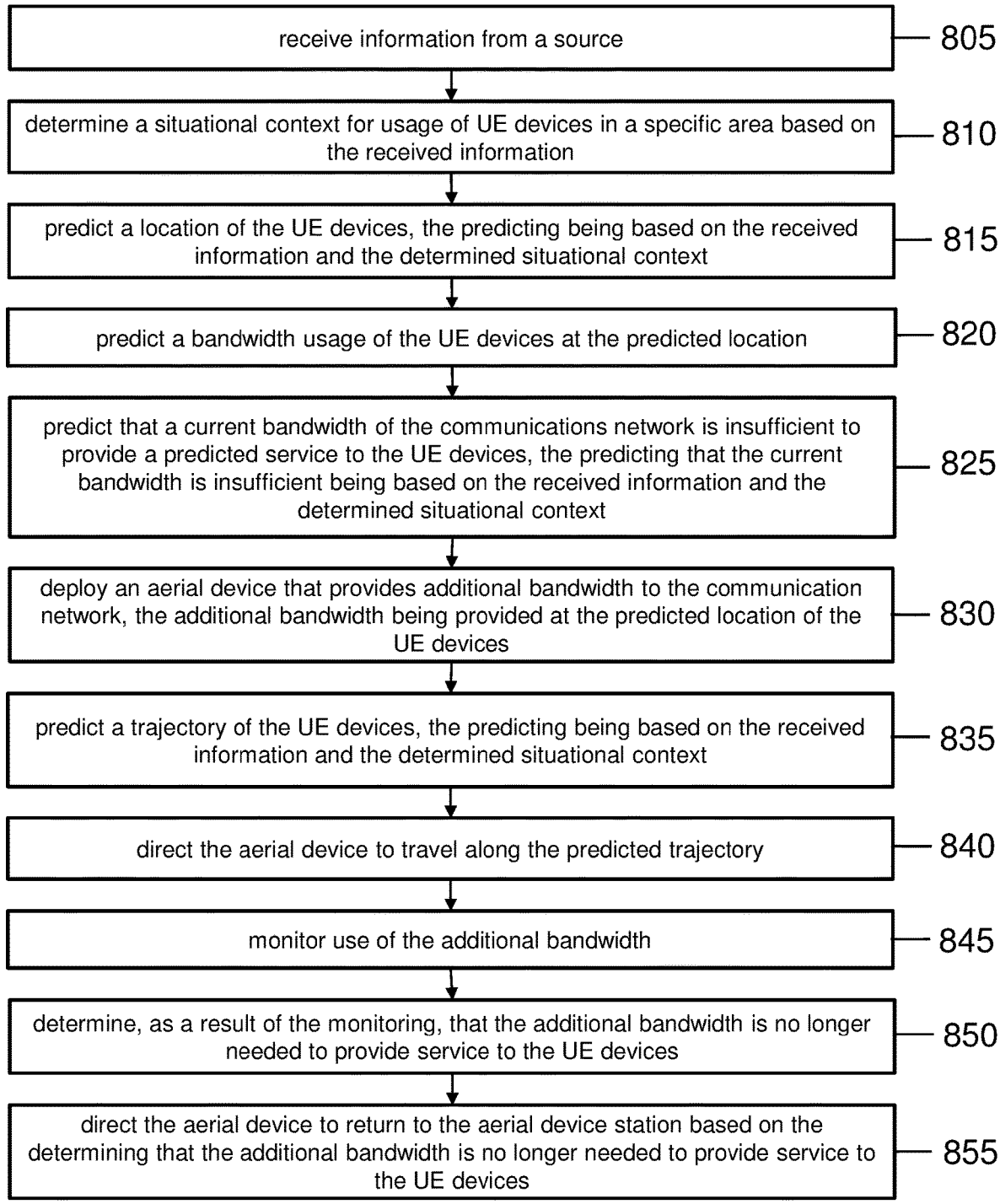
FIG. 8 shows a flowchart of an exemplary method in accordance with aspects of the invention.

FIG. 8 shows a flowchart of an exemplary method in accordance with aspects of the present invention. Steps of the method may be carried out in the environment of FIG. 4 and are described with reference to elements depicted in FIG. 4.

At step 805, the system receives information from a source. In embodiments, and as described with respect to FIG. 4, network capacity augmentation module 110 receives information over network 200 from information resources 250 with, for example, source stream capture module 528.

At step 810, the system determines a situational context for usage of UE devices in a specific area based on the received information. In embodiments, and as described with respect to FIG. 4, network capacity augmentation module 110 determines a situational context for usage of user end devices 400 along route 700 based on the information received from information resources 250 with, for example, situation-based classifier 530.

At step 815, the system predicts a location of the UE devices, the predicting being based on the received information and the determined situational context. In embodiments, and as described with respect to FIG. 4, network capacity augmentation module 110 (with, for example, location to activity mapper 562) predicts area 730 as a location of UE devices 400, the predicting being based on the information received from information resources 250 and the situational context determined by situation-based classifier 530.

At step 820, the system predicts a bandwidth usage of the UE devices at the predicted location. In embodiments, and as described with respect to FIG. 4, network capacity augmentation module 110 predicts a bandwidth usage of UE devices 400 at area 730 with, for example, bandwidth estimation logic 532.

At step 825, the system predicts that a current bandwidth of the communications network is insufficient to provide a predicted service to the UE devices, the predicting that the current bandwidth is insufficient being based on the received information and the determined situational context. In embodiments, and as described with respect to FIG. 4, network capacity augmentation module 110 (with, for example, bandwidth to situation classifier 538) predicts that a current bandwidth of communications network 300 is insufficient to provide a predicted service to UE devices 400, the predicting that the current bandwidth is insufficient being based on the information received from information resources 250 and the situational context determined by situation-based classifier 530.

At step 830, the system deploys an aerial device that provides additional bandwidth to the communication network, the additional bandwidth being provided at the predicted location of the UE devices. In embodiments, and as described with respect to FIG. 4, network capacity augmentation module 110 (with, for example, aerial device movement controller 504) deploys aerial device 350 that provides additional bandwidth to communication network 300, the additional bandwidth being provided at location 730 of UE devices 400.

At step 835, the system predicts a trajectory of the UE devices, the predicting being based on the received information and the determined situational context. In embodiments, and as described with respect to FIG. 4, network capacity augmentation module 110 (with, for example, trajectory manager 550) predicts a trajectory along route 700 of UE devices 400, the predicting being based on the information received from information resources 250 and the situational context determined by situation-based classifier 530.

At step 840, the system directs the aerial device to travel along the predicted trajectory. In embodiments, and as described with respect to FIG. 4, network capacity augmentation module 110 (with, for example, trajectory manager 550) directs aerial device 350 to travel along route 700.

At step 845, the system monitors use of the additional bandwidth. In embodiments, and as described with respect to FIG. 4, network capacity augmentation module 110 (with, for example, bandwidth to situation classifier 538) monitors use of the additional bandwidth supplied by aerial device 350 to communications network 300.

At step 850, the system determines, as a result of the monitoring, that the additional bandwidth is no longer needed to provide service to the UE devices. In embodiments, and as described with respect to FIG. 4, network capacity augmentation module 110 determines (with, for example, bandwidth to situation classifier 538), as a result of the monitoring, that the additional bandwidth is no longer needed to provide service to UE devices 400.

At step 855, the system directs the aerial device to return to the aerial device station based on the determining that the additional bandwidth is no longer needed to provide service to the UE devices. In embodiments, and as described with respect to FIG. 4, network capacity augmentation module 110 (with, for example, aerial device movement controller 504) directs aerial device 350 to return to the aerial device station based on network capacity augmentation module 110 determining that the additional bandwidth is no longer needed to provide service to UE devices 400.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving, by a computing device, information from a source;
   determining, by the computing device, a situational context for usage of user end (UE) devices in a specific area based on the received information, the UE devices communicating over a communication network and utilizing bandwidth of the communication network, the communication network being a fifth generation (5G) network;
   predicting, by the computing device, a location of the UE devices, the predicting being based on the received information and the determined situational context;
   predicting, by the computing device, a bandwidth usage of the UE devices at the predicted location;
   predicting, by the computing device, that a current bandwidth of the communications network is insufficient to provide the predicted bandwidth usage to the UE devices, the predicting that the current bandwidth is insufficient being based on the received information and the determined situational context; and
   deploying, by the computing device, an aerial device that provides additional bandwidth to the communication network, the additional bandwidth being provided at the predicted location of the UE devices, the aerial device comprising an evolved-universal mobile telecommunications service terrestrial radio access network NodeB (eNodeB) of the 5G network to provide the additional bandwidth;
   creating, by the computer device, a dedicated logical channel between the aerial device eNodeB and a static eNodeB;
   sending, by the computing device, control instructions to the static eNodeB over an aerial device station interconnect to create the dedicated logical channel over a virtual S1 bearer of the communications network, the dedicated logical channel being a logical dedicated traffic channel (logical DTCH); and
   sending, by the computing device, application program interface signals to the static eNodeB to instruct the static eNodeB to treat input and output on the logical DTCH differently than input and output of other devices,
   wherein the eNodeB on the aerial device performs data compression, alignment, and deduplication, and
   data compression, alignment, and deduplication are bypassed at the static eNodeB and a data stream over the virtual S1 bearer is directly integrated into the communication network.

2. The method of claim 1, wherein the eNodeB of the aerial device communicates with the static eNodeB of the communications network over an S1 bearer.

3. The method of claim 2, wherein the eNodeB of the aerial device performs data compression, alignment, and deduplication on communications from the UE devices.

4. The method of claim 3, wherein communications from the eNodeB of the aerial device pass through the static eNodeB without the static eNodeB performing data compression, alignment, and deduplication on the communications from the eNodeB of the aerial device.

5. The method of claim 4, wherein the deploying comprises transmitting instructions to an aerial device station to launch the aerial device.

6. The method of claim 5, further comprising monitoring, by the computing device, use of the additional bandwidth; and
   determining, by the computing device and as a result of the monitoring, that, after the providing the additional bandwidth, the additional bandwidth is no longer needed to provide service to the UE devices.

7. The method of claim 6, further comprising directing, by the computing device, the aerial device to return to the aerial device station based on the determining that the additional bandwidth is no longer needed to provide service to the UE devices.

8. The method of claim 4, further comprising predicting, by the computing device, a trajectory of the UE devices, the predicting being based on the received information and the determined situational context; and
   directing, by the computing device, the aerial device to travel along the predicted trajectory,
   wherein the additional bandwidth is provided along the predicted trajectory.

9. The method of claim 8, wherein the predicted trajectory includes a poor coverage region, the poor coverage region being a geographical region where the current bandwidth of the communication network is less than a projected bandwidth requirement of the UE devices.

10. The method of claim 1, wherein the receiving the information comprises receiving the information from a plurality of sources.

11. The method of claim 1, wherein the information is at least one of the group consisting of:
   an event listing; and
   environmental data.

12. The method of claim 1, wherein the computing device includes software provided as a service in a cloud environment.

13. A computer program product comprising one or more computer readable storage media having program instructions collectively stored on the one or more computer readable storage media, the program instructions executable to:
   receive information from a source;
   determine a situational context for usage of user end (UE) devices in a specific area based on the received information, the UE devices communicating over a communication network and utilizing bandwidth of the communication network, the communication network being a fifth generation (5G) network;
   predict a location of the UE devices, the predicting being based on the received information and the determined situational context;
   predict a bandwidth usage of the UE devices at the predicted location;
   predict that a current bandwidth of the communications network is insufficient to provide the predicted bandwidth usage to the UE devices, the predicting that the current bandwidth is insufficient being based on the received information and the determined situational context;
   deploy an aerial device that provides additional bandwidth to the communication network, the additional bandwidth being provided at the predicted location of the UE devices, the aerial device comprising an evolved-universal mobile telecommunications service terrestrial radio access network NodeB (eNodeB) of the 5G network to provide the additional bandwidth;
   create a dedicated logical channel between the aerial device eNodeB and a static eNodeB;

monitor use of the additional bandwidth;
determine, as a result of the monitoring and after providing the additional bandwidth, the additional bandwidth is no longer needed to provide service to the UE devices;
send control instructions to the static eNodeB over an aerial device station interconnect to create the dedicated logical channel over a virtual S1 bearer of the communications network, the dedicated logical channel being a logical dedicated traffic channel (logical DTCH); and
send application program interface signals to the static eNodeB to instruct the static eNodeB to treat input and output on the logical DTCH differently than input and output of other devices,
wherein the eNodeB on the aerial device performs data compression, alignment, and deduplication, and
data compression, alignment, and deduplication are bypassed at the static eNodeB and a data stream over the virtual S1 bearer is directly integrated into the communication network.

14. The computer program product of claim 13, wherein the deploying comprises transmitting instructions to an aerial device station to launch the aerial device.

15. The computer program product of claim 14, wherein the program instructions are further executable to direct the aerial device to return to the aerial device station based on the determining that the additional bandwidth is no longer needed to provide service to the UE devices.

16. A system comprising:
a processor, a computer readable memory, one or more computer readable storage media, and program instructions collectively stored on the one or more computer readable storage media, the program instructions executable to:
receive information from a source;
determine a situational context for usage of user end (UE) devices in a specific area based on the received information, the UE devices communicating over a communication network and utilizing bandwidth of the communication network, the communication network being a fifth generation (5G) network;
predict a location of the UE devices, the predicting being based on the received information and the determined situational context;
predict a bandwidth usage of the UE devices at the predicted location;
predict that a current bandwidth of the communications network is insufficient to provide the predicted bandwidth usage to the UE devices, the predicting that the current bandwidth is insufficient being based on the received information and the determined situational context;
deploy an aerial device that provides additional bandwidth to the communication network, the additional bandwidth being provided at the predicted location of the UE devices, the aerial device comprising an evolved-universal mobile telecommunications service terrestrial radio access network NodeB (eNodeB) of the 5G network to provide the additional bandwidth;
create a dedicated logical channel between the aerial device eNodeB and a static eNodeB;
predict a trajectory of the UE devices, the predicting being based on the received information and the determined situational context;
direct the aerial device to travel along the predicted trajectory;
send control instructions to the static eNodeB over an aerial device station interconnect to create the dedicated logical channel over a virtual S1 bearer of the communications network, the dedicated logical channel being a logical dedicated traffic channel (logical DTCH); and
send application program interface signals to the static eNodeB to instruct the static eNodeB to treat input and output on the logical DTCH differently than input and output of other devices,
wherein the eNodeB on the aerial device performs data compression, alignment, and deduplication,
data compression, alignment, and deduplication are bypassed at the static eNodeB and a data stream over the virtual S1 bearer is directly integrated into the communication network, and
the additional bandwidth is provided along the predicted trajectory.

17. The system of claim 16, wherein the eNodeB of the aerial device communicates with the static eNodeB of the communications network over an S1 bearer.

18. The system of claim 17, wherein the eNodeB of the aerial device performs data compression, alignment, and deduplication on communications from the UE devices, and
communications from the eNodeB of the aerial device pass through the static eNodeB without the static eNodeB performing data compression, alignment, and deduplication on the communications from the eNodeB of the aerial device.

19. The system of claim 16, wherein
the specific area is a specific event, and
the predicting the bandwidth usage comprises determining that photographs and videos are commonly taken at events such as the specific event.

* * * * *